United States Patent [19]
Drabik

[11] 3,739,209
[45] June 12, 1973

[54] RECTIFIER ASSEMBLY

[75] Inventor: Walter Drabik, Downers Grove, Ill.

[73] Assignee: General Motors Corporation, Detroit, Mich.

[22] Filed: Aug. 31, 1972

[21] Appl. No.: 285,551

[52] U.S. Cl. .............. 310/64, 310/68 D, 317/100, 321/8
[51] Int. Cl. ............................................ H02k 9/04
[58] Field of Search............... 310/68 R, 68 D, 59, 310/64; 321/8; 317/100; 174/DIG. 5

[56] References Cited
UNITED STATES PATENTS
3,553,505  1/1971  Sato................................. 310/68 D

*Primary Examiner*—J. D. Miller
*Assistant Examiner*—H. Huberfield
*Attorney*—E. W. Christen and C. R. Meland

[57] ABSTRACT

A rotatable rectifier assembly which can be used to feed the field winding of a generator from an exciter generator that has a three-phase Y-connected output winding. The rectifier assembly comprises an annular insulator which carries three heat sinks on one side thereof and two heat sinks on the opposite side thereof. The three heat sinks form AC input terminals for the rectifier assembly and carry diodes forming part of a three-phase full-wave bridge rectifier circuit. The other two heat sinks also carry diodes and form direct current output terminals for the rectifier assembly. The heat sinks, when secured to the insulator, form alternate notches and flanges and the diodes are mounted on the flanges such that they extend generally peripherally of the assembly to facilitate connection of the diodes. The arrangement is such that two diodes are connected in series between a respective direct current output terminal and an AC input terminal and all of the diodes are mounted on heat sinks to facilitate operating the diodes at a proper temperature.

3 Claims, 4 Drawing Figures

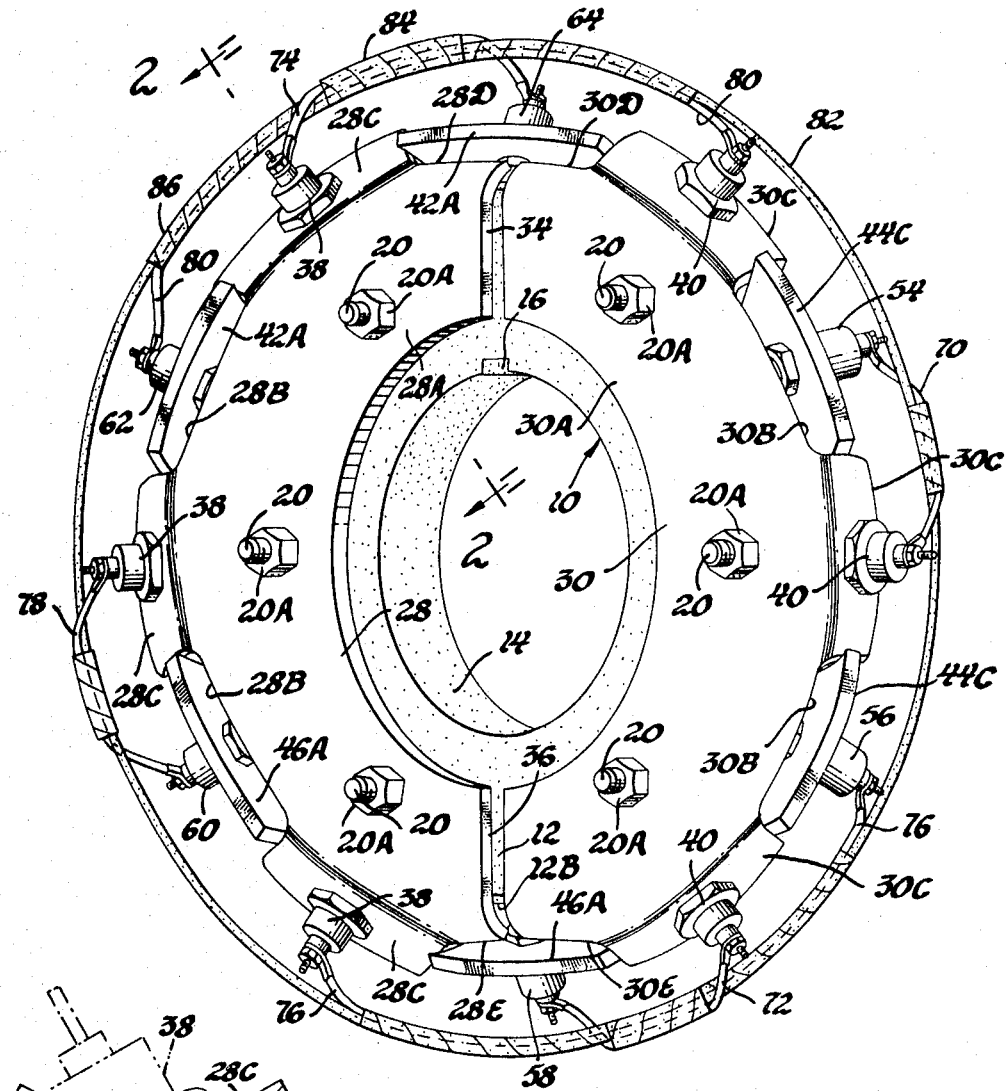
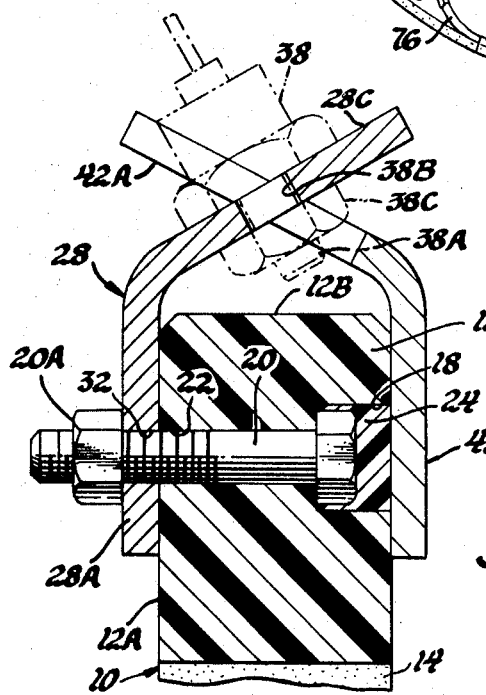
Fig. 1
Fig. 2

Patented June 12, 1973

RECTIFIER ASSEMBLY

This invention relates to a rotatable rectifier assembly which may be mounted on the shaft of a dynamoelectric machine to rotate therewith and may be used to supply the field winding of a generator from an alternating current exciter generator.

It is well known in the art of dynamoelectric machines to provide a unitary rectifier assembly which is fixed to the shaft of a machine and which is electrically connected to supply the field winding of a generator from an exciter generator having a polyphase output winding.

It is also well known to provide rectifier arrangements wherein a plurality of diodes are mounted respectively on two heat sinks which respectively form positive and negative direct current output terminals. This can be accomplished by connecting the diodes to the heat sinks such that the anodes of one group of diodes are electrically connected to one heat sink while the cathodes of the other group of diodes are connected to the other heat sink. This arrangement can be utilized to form a three-phase full-wave bridge rectifier network by connecting the diodes to AC input terminals.

The present invention is concerned with providing a three-phase full-wave bridge rectifier network where pairs of diodes are connected in series between AC input terminals and direct current output terminals of the bridge rectifier. It accordingly is one of the objects of this invention to provide a rotatable rectifier assembly where pairs of series connected diodes are utilized in the bridge and where the diodes are provided with adequate heat sinking to dissipate the heat generated by the diodes. In carrying this object forward the rectifier assembly of this invention utilizes three heat sinks which form AC input terminals for the bridge rectifier circuit. Each of these heat sinks carries two diodes which respectively have their anodes and cathodes connected to the heat sink. The remainder of the diodes are supported by two other heat sinks which form direct current output terminals for the bridge rectifier circuit and these heat sinks are connected in common respectively with the anodes and cathodes of the three other diodes. The diodes carried by the direct current heat sinks and the AC input terminal heat sinks are then electrically connected by conductors to form a three-phase full-wave bridge having two series connected diodes in each leg thereof.

Another object of this invention is to provide a rotatable rectifier assembly of the type described wherein the three heat sinks that form the AC input terminals are supported at one side of an annular insulator. The two direct current output terminal heat sinks are supported on the opposite side of the insulator and the heat sinks are arranged to form alternate notches and flanges disposed about the outer periphery of the rectifier assembly. The diodes are mounted on the flanges so that they extend generally radially of the outer periphery of the rectifier assembly whereby they are easily connected by an annular wiring harness disposed about the rectifier assembly.

IN THE DRAWINGS

FIG. 1 is a perspective view of one side of a rotatable rectifier assembly made in accordance with this invention;

FIG. 2 is a sectional view taken along line 2—2 of FIG. 1;

Figure 3:
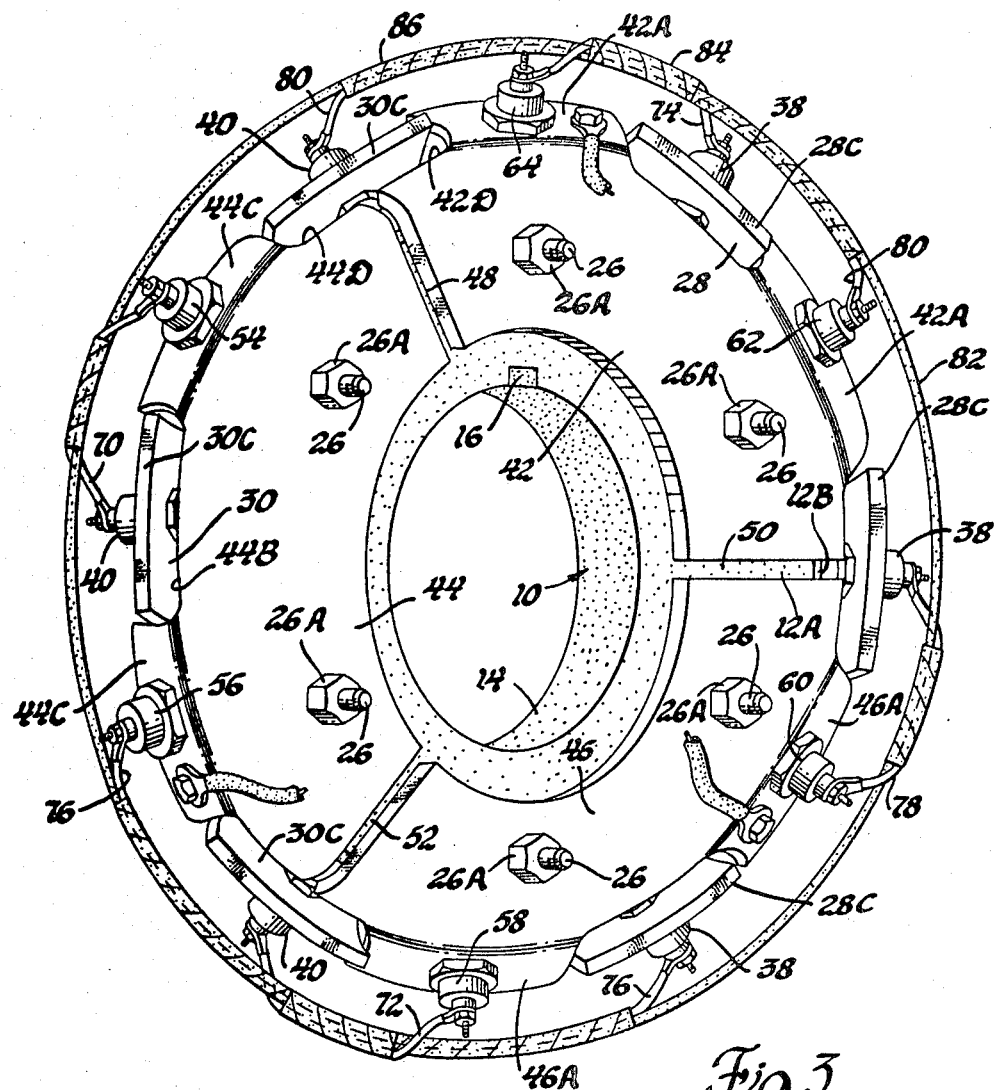
FIG. 3 is a perspective view of an opposite side of the rotatable rectifier shown in FIG. 1.

Referring now to the drawings and more particularly to FIG. 1 the reference numeral 10 generally designates an annular insulator which is formed by molding or casting an electrical insulating material. The annular insulator 10 has a heat sink mounting portion 12 shown in FIG. 2 and a hub portion 14. The hub portion 14 has keyway 16 which is adapted to receive a key when the rectifier assembly is mounted to the shaft of a dynamoelectric machine which is not illustrated. When mounting the rectifier assembly to a shaft the hub 14 is slipped over the outer periphery of a steel insert (not shown) forming a hub that is rotatable with the shaft. The steel insert, which is not illustrated, has a keyway matching the keyway 16 and the steel hub and annular insulator 10 are drivingly connected together by placing a key in the two slots as is well known to those skilled in the art.

The annular insulator has a plurality of recesses designated by reference numeral 18 disposed on opposite sides of the heat sink mounting portion 12. One of these recesses is illustrated in the sectional view of FIG. 2 and it is seen that the head of a bolt 20 is disposed within the recess 18. The bolt projects through an opening 22 in the mounting portion 12 as is clearly apparent from FIG. 2. The bolt 20 is held in place by a potting compound 24 which is placed in each recess after each bolt is mounted to the insulator 10. The potting compound may be a suitable epoxy resin composition.

It can be seen from an inspection of FIG. 1 that there are six bolts 20 disposed about the periphery of the annular insulator 10. In similar fashion the insulator 10 carries six bolts 26 which project in an opposite direction from the bolts 20 and which are supported by the annular insulator 10 in the same manner as bolt 20 illustrated in FIG. 2.

The bolts 20 and 26 are utilized to support metallic heat sinks in a manner which will now be described. Referring to FIG. 1 it is seen that the bolts 20, with their associated nuts 20A, respectively support aluminum heat sinks designated by reference numerals 28 and 30. The heat sink 28 is segmental in shape and extends substantially one-half the circumference of the annular insulator 10. The heat sink 28 has holes 32 which receive the bolts 20 when the heat sink or segment 28 is mounted to the annular insulating part 12. It is seen that the semicircular section 28A of the heat sink 28 is mounted flat against one end wall 12A of the support portion 12. The heat sink 28 has alternate notches 28B and flange sections 28C. The flange sections 28C extend across the outer circumferential wall 12B of the annular support section 12 as is illustrated in FIG. 2.

The heat sink 30 is identical with the heat sink 28 in that it has a section 30A mounted flat against the wall 12A of the annular insulator 12 and has alternate notches 30B and flange sections 30C which project across the outer periphery 12B of the annular insulator.

In fabricating the heat sinks or segments 28 and 30 a piece of aluminum material of approximately one quarter inch thickness having high thermal and electrical conductivity is utilized. A circular piece of this material is provided and the material is subjected to a spinning operation or pressed into such a shape as to cause the flange sections 28C and 30C to be located at an angle to the sections 28A and 30A or in other words to form a generally dish-shaped part. Following this spinning operation the dish-shaped part is notched to form the notches 30B and 28B and the dish-shaped part is then cut to form the two parts which are separated by the gaps 34 and 36 illustrated in FIG. 1. During the notching operation, notches are formed which turn into complementary half-notch pairs 28D–30D and 28E–30E when the dish-shaped part is cut in half.

It will, of course, be appreciated that the segments or heat sinks 28 and 30 with their associated holes are fitted respectively to the bolt ends 20 during assembly of the heat sinks to the annular insulator 10. The two heat sinks 28 and 30 are held to the annular insulator 10 by the nuts 20A illustrated in FIGS. 1 and 2.

Figure 4:
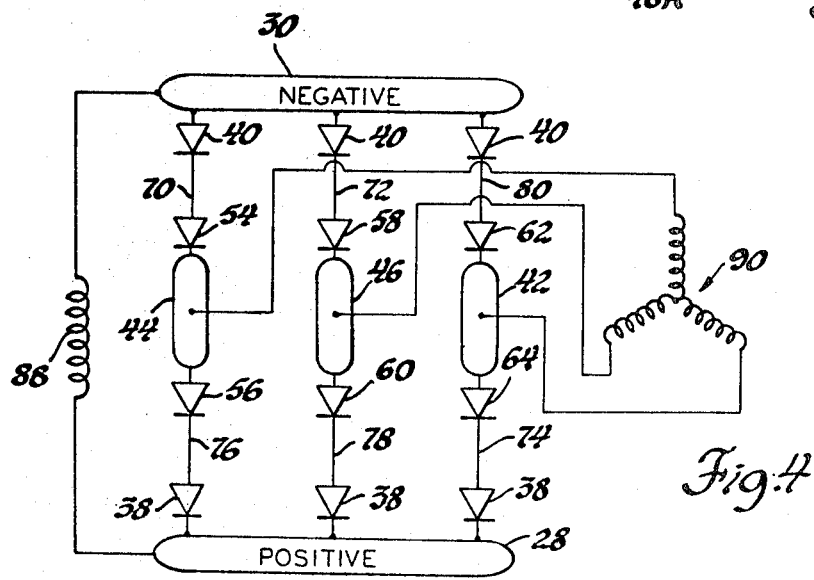
FIG. 4 is a schematic electrical circuit diagram illustrating the electrical connections of the diodes of the rotatable rectifier of this invention.

The flange sections 28C of heat sink 28 each carry a semiconductor diode which may be of the silicon type. These diodes are designated by reference numeral 38 and it is seen from FIG. 2 that the case of the diode directly contacts one wall of a respective flange 28C. The diodes have a threaded stud 38A passing through a hole 38B formed in each flange 28C. The diodes are fixed to the flanges by mounting nuts one of which is designated by reference numeral 38C in FIG. 2. The base of the diodes 38 readily conduct heat to the flange sections 28C and the diode junctions or diodes 38 are so poled within the base or case of the diode that the cathodes thereof are electrically connected with the metallic heat sink 28 as is illustrated in FIG. 4. The heat sink 28 therefore forms a common positive electrical terminal for the cathodes of the diodes 38 and also forms a common heat sink for these three diodes.

The heat sink 30 carries three diodes 40 which are again mounted on the flange sections of the heat sink designated by reference numeral 30C. The diodes 40 are mounted in the same manner as the diode 38 shown in FIG. 2 but the rectifying junction within these diodes is reversed so that the anodes of diodes 40 are all electrically connected to the heat sink 30 as shown in FIG. 4. This means that the heat sinks 28 and 30 respectively form the positive and negative direct current output terminals for the bridge rectifier circuit shown in FIG. 4.

Referring now to FIG. 3 a view of the rectifier assembly is illustrated which is opposite to that of FIG. 1. In FIG. 3 three metallic segments or heat sinks 42, 44 and 46 are mounted to the annular insulator 10. The segments 42, 44 and 46 are arranged on the insulator to provide alternate notches and flanges. Thus, heat sink 44 has flanges 44C and notch 44B located therebetween. In a similar fashion heat sink 42 is provided with flanges 42A and heat sink 46 is provided with flanges 46A. It is seen that adjacent heat sinks, for example heat sinks 42 and 44, have what might be termed complementary half-notches 44D and 42D which form a single notch which receives one of the flanges 30C from heat sink 30 mounted on the other side of the insulator. The three heat sinks 42, 44 and 46 are spaced by slots 48, 50 and 52 and the arrangement is such that the flanges of heat sinks 42, 44 and 46 fit within the notches formed in the heat sinks 28 and 30 and vice versa.

The heat sink 44 carries diodes 54 and 56 on the flanges 44C and the rectifying junctions of these diodes are poled as illustrated in FIG. 4 with the cathode of diode 54 connected to heat sink 44 and the anode of diode 56 connected to the heat sink 44. In a like manner flanges 46A carry diodes 58 and 60 and flanges 42A carry diodes 62 and 64. The rectifying junctions of these diodes are poled as illustrated in the schematic electrical circuit diagram shown in FIG. 4.

It will be observed from the schematic circuit diagram of FIG. 4 that pairs of diodes, for example diodes 40 and 54, are connected in series between a respective direct current output terminal and a respective AC input terminal. It will of course be appreciated that the heat sinks 44, 42 and 46 form AC input terminals for the bridge rectifier and also form heat sinks for two pairs of diodes. Thus, the heat sink 44 provides a heat sink for diodes 54 and 56 and also provides an electrical connection for connecting the cathode of diode 54 to the anode of diode 56.

In order to electrically connect pairs of diodes in series the conductors 70, 72, 74, 76, 78 and 80 are provided which are shown schematically in FIG. 4. The actual physical construction of these conductors is shown in FIGS. 1 and 3 and the same reference numerals have been used in FIGS. 1, 3 and 4 to identify the same electrical conductors which connect pairs of diodes in series. These conductors form part of a wiring harness, illustrated in FIG. 1 and 3, which comprises a relatively stiff ring 82 which is formed of insulating material. The ring 82 is disposed about the outer periphery of the rectifier assembly and closely adjacent the stud terminals of the diodes. The ring 82 carries the conductors 70–80 which are taped to the annular insulator ring 82, as shown in FIGS. 1 and 3. As an example, it can be seen that conductor 80 is disposed on the inside of the insulator ring 82 and connects diodes 40 and 62 while conductor 74 is disposed on the outside of the ring 82 and connects diodes 38 and 64. The conductors are held in place by tape designated 84 and 86. A similar arrangement is utilized for supporting conductors 70, 72, 76 and 78 which connect respective diodes as illustrated in FIGS. 1, 3 and 4.

It is seen that by mounting the diodes from the various segments or heat sinks on the flanges, for example flanges 28C and an adjacent flange 42A, the diodes are positioned substantially radially of the outer periphery of the rectifier assembly whereby the simple wiring harness including support 82 can be utilized to connect pairs of series connected diodes.

The rotatable rectifier assembly, as mentioned before, is useful in supplying the field of a generator from an alternating current exciter generator. When the rotatable rectifier is utilized for this purpose the field of the generator, designated by reference numeral 88 in FIG. 4, is connected directly across the positive and negative terminals of the bridge circuit. The AC input terminals 44, 46 and 42 are then fed from a three-phase Y-connected output winding of an exciter generator which is designated by reference numeral 90 in FIG. 4.

It will be observed that the rotatable rectifier assembly of this invention is a very compact unit and has a minimum axial dimension. This is accomplished by interleaving the flanges from the heat sinks of one side of the rectifier with the flanges from the heat sinks of the other side of the rectifier. To put it another way, the flanges from the heat sinks on the one side of the rectifier are located within notches formed by the heat sinks on the other side of the rectifier to in effect provide a series of flanges located peripherally of the rectifier assembly with each flange carrying a diode which has good heat transfer characteristics to the spun aluminum heat sinks.

The three heat sinks 42, 44 and 46 are formed by a similar method to the method of manufacturing heat sinks 28 and 30. Thus, in forming these three heat sinks an annular piece of aluminum material is spun into a dish-shaped part. This part is then notched to form alternate flanges and notches and then cut at 48, 50 and 52 to form the three heat sinks. These heat sinks have holes which receive the bolt ends 26 and are secured to the annular insulator by the nuts 26A illustrated in FIG. 3.

By forming the heat sinks by spinning or by a pressing operation the heat sinks and particularly the flange sections thereof, are better adapted to withstand the strain of centrifugal force to which the flange sections are subjected during rotary operation of the rotating rectifier assembly.

What is claimed is:

1. A bridge rectifier assembly comprising, an insulator member having an outer peripheral wall joining opposite sides thereof, first metallic heat sink means supported by said insulator member having a support section located at one side thereof and having first spaced flange sections extending at least partially across said wall, second metallic heat sink means supported by said insulator member having a support section located at an opposite side thereof and having second spaced flange sections extending at least partially across said wall, said first and second flange sections being located in alternate interfitting relationship, diodes supported by at least some of said flange sections located in electrical and heat exchange relationship therewith, said metallic heat sink means forming common electrical connections for the diodes mounted on the flange sections thereof, and conductor means located about the outer periphery of said assembly electrically connecting certain of said diodes.

2. A bridge rectifier assembly comprising, a substantially annular insulator member having first and second oppositely disposed end walls and an outer circumferentially extending wall, a plurality of circumferentially spaced first metallic heat sinks supported by said insulator member each having a portion engaging said first end wall and having at least one flange section extending at least partially over said circumferentially extending wall of said insulator member, a plurality of second circumferentially spaced metallic heat sinks supported by said insulator member each having a portion engaging said second end wall and having at least one flange section extending over said circumferentially extending wall of said insulator member, said flange sections of said first metallic heat sinks located between said flange sections of said second metallic heat sinks whereby said first and second flange sections have an interfitting relationship about the outer periphery of said rectifier assembly, diodes supported by at least some of said flange sections located in electrical and heat exchange relationship therewith, and conductor means located adjacent the outer periphery of said rectifier assembly electrically connecting certain of said diodes.

3. A rotatable three phase full-wave bridge rectifier assembly for dynamoelectric machines comprising, an annular insulator member adapted to be rotatably driven by the shaft of a dynamoelectric machine, said insulator member having first and second oppositely disposed end walls and an outer peripheral wall joining said end walls, three metallic heat sinks carried by said insulator member forming AC input terminals for said assembly, each of said three heat sinks having a section engaging said first end wall and each having two flange sections extending at least partially across said outer peripheral wall of said insulator member, two metallic heat sinks carried by said insulator member forming direct current output terminals for said assembly, each of said two heat sinks having a section engaging said second end wall and each having three flange sections extending at least partially across said outer peripheral wall of said insulator member, said flange sections from said three heat sinks and said flange sections from said two heat sinks located in alternate interfitting relationship, pairs of oppositely poled diodes carried by the flange sections of said three metallic heat sinks that form the AC input terminals for said assembly, a first group of diodes carried by the flange sections of one of said two heat sinks that form the direct current output terminals of said assembly, a second group of diodes carried by the flange sections of said other of said two heat sinks that form the direct current output terminals of said assembly, said first and second groups of diodes being oppositely poled with respect to said two heat sinks, and conductor means disposed about said outer peripheral wall connecting said pairs of oppositely poled diodes respectively with diodes of said groups of diodes.

* * * * *